United States Patent
Staschewski et al.

[11] Patent Number: 6,107,597
[45] Date of Patent: Aug. 22, 2000

[54] LASER BEAM WELDING DEVICE WITH RADIATION TRAP

[75] Inventors: Harry Staschewski; Siegfried Wandelt, both of Langenhagen, Germany

[73] Assignee: Alcatel, Paris, France

[21] Appl. No.: 09/135,940

[22] Filed: Aug. 18, 1998

[30] Foreign Application Priority Data

Aug. 20, 1997 [DE] Germany .................. 197 36 042

[51] Int. Cl.$^7$ ........................................ B23K 26/00
[52] U.S. Cl. ..................... 219/121.63; 219/121.86
[58] Field of Search ................ 219/121.6, 121.62, 219/121.63, 121.64, 121.74, 121.84, 121.86

[56] References Cited

U.S. PATENT DOCUMENTS

| | | | |
|---|---|---|---|
| 3,813,511 | 5/1974 | Staal | 219/121.74 X |
| 4,288,678 | 9/1981 | LaRocca | 219/121.84 X |
| 4,409,463 | 10/1983 | Duruz et al. . | |
| 4,575,610 | 3/1986 | Gavin | 219/121.6 |
| 4,665,298 | 5/1987 | LaRocca | 219/121.6 |
| 4,730,113 | 3/1988 | Edwards et al. | 219/121.62 X |
| 4,759,487 | 7/1988 | Karlinski | 219/121.63 X |
| 4,864,098 | 9/1989 | Basanese et al. . | |
| 5,613,631 | 3/1997 | Ziemek et al. . | |
| 5,643,477 | 7/1997 | Gullo et al. | 219/121.86 |
| 5,658,473 | 8/1997 | Ziemek . | |

FOREIGN PATENT DOCUMENTS

| | | |
|---|---|---|
| 61-135497 | 6/1986 | Japan . |
| 62-071903 | 4/1987 | Japan . |
| 1-048694 | 2/1989 | Japan . |
| 7-204878 | 8/1995 | Japan . |
| 8-118056 | 5/1996 | Japan . |

*Primary Examiner*—Gregory Mills
*Attorney, Agent, or Firm*—Ware, Fressola, Van der Sluys & Adolphson LLP

[57] ABSTRACT

A device for making metal tubing comprises a tube forming device for shaping a continuously conveyed metal band into an open seam tube and a welding device for welding the longitudinal seam of the tube. The welding device is a laser welding device with a welding head which is inclined at an angle with respect to the vertical. Disposed after the laser welding head is a radiation trap for trapping reflected laser beams. The radiation trap (3) is composed of a metallic housing with water-cooled walls and an inner surface which is blackened. The radiation trap (3) is arranged relative to the laser welding head (1) in such a way that the reflected laser beams (1b) are guided into the inside of the housing.

9 Claims, 1 Drawing Sheet

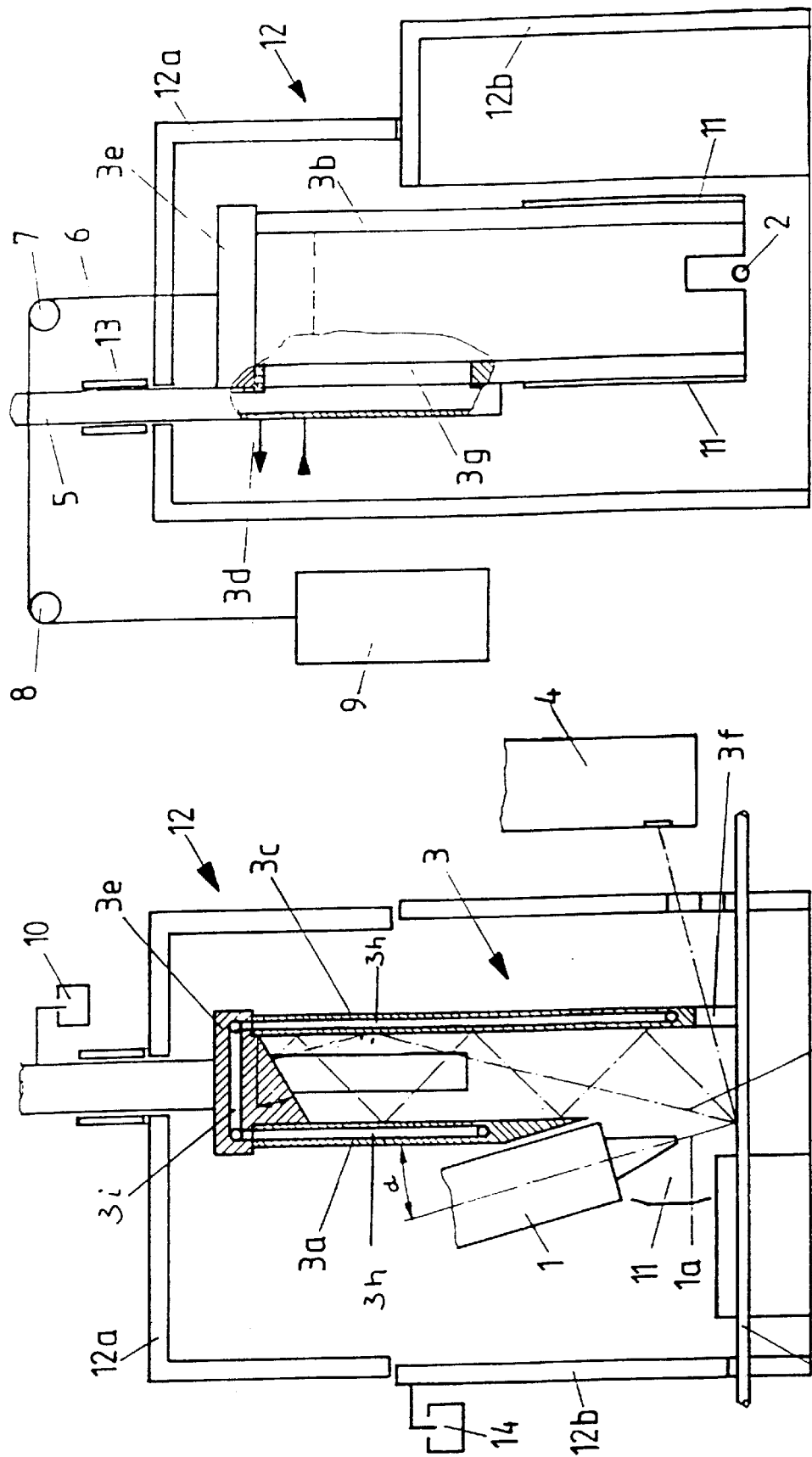

LASER BEAM WELDING DEVICE WITH RADIATION TRAP

BACKGROUND OF THE INVENTION

1. Technical Field

The invention relates to a device for welding longitudinal seams of metal tubing with a laser welding device.

2. Description of the Prior Art

From U.S. Pat. No. 5,613,631, there is known a method for manufacturing a metal tube with a longitudinal weld seam wherein a metal band is withdrawn from a supply reel and shaped by a shaping tool into a tube with a longitudinal seam, and wherein the longitudinal seam is welded with a laser welding device. This method has the disadvantage that the laser beams reflected from the surface of the tube can dangerously and uncontrollably propagate and thereby injure people and/or damage objects.

It is known that only a small portion of the laser energy is usable as welding energy, and that a larger portion is reflected. Moreover, the laser light may not be in the visible spectral range, thus requiring more complex and expensive radiation protection.

From U.S. Pat. No. 5,658,473, there is known a method for manufacturing metal tubes with longitudinal weld seams wherein the longitudinal seam of the tube to be welded is welded with the help of two laser welding heads which are inclined in the longitudinal direction of the tube. Between the laser welding heads and above the weld seam, there is provided a water-cooled apron for absorbing the reflected laser beams and for removing the absorbed heat through the cooling water. Since the gap which has to be maintained between the laser welding heads, must be small, the apron has rather limited utility.

SUMMARY OF THE INVENTION

It is therefore an object of the present invention to improve the device of the type described above in such a way that the beams reflected by the tube surface are rendered harmless to the greatest possible extent, so that the risk for operators and personnel in the vicinity of the device is minimized.

With the device of the invention, the laser beams are deflected multiple times inside the radiation trap which is formed as a housing, and absorbed by the blackened surface, so that the energy of the laser beams is advantageously converted into heat energy which is removed by cooling the walls.

The invention will be fully understood when reference is made to the following detailed description taken in conjunction with the accompanying drawing.

BRIEF DESCRIPTION OF THE DRAWING

FIG. 1 is a side view of the welding device of the present invention with portions broken away and in section to reveal internal structure; and FIG. 2 is an end view of the welding device of the present invention with portions broken away and in section to reveal internal structure.

DETAILED DESCRIPTION OF THE INVENTION

A laser welding head 1 is arranged at an angle α with respect to the vertical such that the focused beam 1a is aimed towards the longitudinal seam (no reference number assigned) of an open seam tube 2 formed from a metal band in a continuous operation.

When viewed along the feed direction of the tube 2, there is arranged after the laser welding head 1 a radiation trap 3 with an opening on the side facing the laser welding head 1 for partially receiving the laser welding head 1. The laser welding head 1 and the radiation trap 3 are spatially arranged relative to each other in such a way that the reflected laser beams 1b are guided into the inside of the radiation trap 3. Inside the radiation trap 3, the laser beams 1b are reflected multiple times by the walls, wherein with each reflection a portion of the laser energy is absorbed by the walls and converted into heat. Cooling water for removing the heat is routed through a system of pipes disposed within the walls of the radiation trap 3.

The radiation trap 3 is formed as a housing with a rectangular cross-section wherein the side walls 3a, 3b, 3c and 3d of the housing are copper plates which are connected, preferably with screws, to form the housing. Each of the copper plates 3a, 3b, 3c and 3d is provided with longitudinal and transverse bores 3h. A baffle or roof wall 3e covers the top of the housing. The baffle 3e is also provided with through bores 3i. The individual bores 3h and 3i, respectively, of the plates 3a, 3b, 3c, 3d and the baffle 3e are joined together to form a continuous system of pipes through which cooling water can be supplied.

The inwardly facing surface of the baffle 3e is inclined towards the tube 2 at an angle relative to the horizontal which corresponds to twice the angle of inclination a of the laser welding head 1. This feature allows the reflected beams 1b to be deflected multiple times by the inside surface of the plates 3a, 3b, 3c and 3d.

To enhance absorption of the laser energy, the inside surfaces of the plates 3a, 3b, 3c, 3d and the baffle 3e are black, preferably black galvanized. Plate 3c includes an opening 3f so that the weld spot can be monitored with a video camera 4.

A continuous exhaust has to be provided during the welding operation, because the weld spot has to be blanketed with an inert gas and additional gases are generated as a result of combustion of grease residues and other impurities on the tube surface. This is accomplished by providing the plate 3d with an longitudinal slot 3g to which a rectangular exhaust pipe 5 is secured. The gases can thereby be removed through an opening in the exhaust pipe 5 corresponding to the longitudinal slot 3g.

The radiation trap 3 can be moved in the vertical direction, i.e. can be raised or lowered. Raising and lowering is facilitated by attaching to the baffle 3e a rope 6 which is guided over rollers 7 and 8. A weight 9 which is slightly less than the total weight of the radiation trap 3 is attached to the free end of the rope 6. In the lowered position, i.e. in the operating position, a safety switch 10 is activated so that the laser welding head 1 can be energized. Protective covers 11 secured to the outside of plates 3b and 3d provide additional protection.

For still more protection, the housing 3 is enclosed by an additional radiation protective housing 12 comprising a stationary top section 12a and a two-part lower section 12b which is moveable perpendicular to the longitudinal axis of the tube 2.

The radiation protective housing 12 is made from, for example, polymethylmethacrylate, which is commercially sold under the name PLEXIGLAS. This material is transparent so that the manufacturing process can be monitored, e.g., by camera 4. When laser radiation impinges on this material,—depending on the intensity of the radiation—the material is first deformed and only in a subsequent stage is a hole formed in the wall.

The exhaust pipe 5 is slideably guided through an opening which is disposed in the top wall of the housing section 12 and incorporates a guide bushing 13.

On the radiation protective housing 12, there is also provided a safety switch 14 which is connected so that the system is enabled only if the radiation protective housing 12 is closed.

The embodiment described above admirably achieves the objects of the invention. However, it will be appreciated that departures can be made by those skilled in the art without departing from the spirit and scope of the invention which is limited only by the following claims.

What is claimed is:

1. Device for welding longitudinal seams of metal tubing, comprising:
   (a) a laser welding device with a laser welding head which is inclined at an angle with respect to vertical; and
   (b) a radiation trap disposed adjacent the laser welding head for trapping reflected laser beams, the radiation trap includes a metallic housing with at least one water-cooled wall and an inner surface which is blackened, and the radiation trap is arranged relative to the laser welding head in such a way that the reflected laser beams are guided into the housing, wherein the at least one water-cooled wall includes a roof wall, an inner surface of the roof wall is oriented at an angle of $2\alpha$ with respect to horizontal, wherein $\alpha$ is the angle of inclination of the laser welding head relative to vertical.

2. Device according to claim 1, wherein the metallic housing defines an opening which is connected to an exhaust pipe.

3. Device according to claim 1, further including an additional radiation protective housing enclosing the metallic housing.

4. Device according to claim 3, wherein the metallic housing which is enclosed by the radiation protective housing can be raised.

5. Device according to claim 4, further including safety switches activated by the metallic housing and the radiation protective housing.

6. Device according to claim 3, wherein the radiation protective housing defines an opening through which an exhaust pipe is routed.

7. Device for welding longitudinal seams of metal tubing, comprising:
   (a) a laser welding device with a laser welding head which is inclined at an angle with respect to vertical; and
   (b) a radiation trap disposed adjacent the laser welding head for trapping reflected laser beams, the radiation trap includes a metallic housing with at least one water-cooled wall and an inner surface which is blackened, and the radiation trap is arranged relative to the laser welding head in such a way that the reflected laser beams are guided into the housing, the housing has a rectangular cross-section, the at least one water-cooled wall is four side walls and a roof wall, the roof wall faces away from the metal tubing, and, in one of the four side walls, there is provided an opening through which the laser welding head extends into the housing, wherein an inner surface of the roof wall is oriented at an angle of $2\alpha$ with respect to horizontal, wherein $\alpha$ is the angle of inclination of the laser welding head relative to vertical.

8. Device according to claim 7, wherein each of the side walls and the roof wall has a system of channels, the channel systems are connected with each other and to a water supply and a water discharge.

9. Device according to claim 7, wherein the side walls and the roof wall are made of copper.

* * * * *